United States Patent [19]

Duttweiler

[11] 4,129,753

[45] Dec. 12, 1978

[54] ECHO CANCELLER USING FEEDBACK TO IMPROVE SPEECH DETECTOR PERFORMANCE

[75] Inventor: Donald L. Duttweiler, Colts Neck, N.J.

[73] Assignee: Bell Telephone Laboratories, Incorporated, Murray Hill, N.J.

[21] Appl. No.: 859,245

[22] Filed: Dec. 9, 1977

[51] Int. Cl.² ............................................. H04B 3/20
[52] U.S. Cl. ................................. 179/170.2; 179/170.6
[58] Field of Search ................. 179/170.2, 170.6, 170.8

[56] References Cited

U.S. PATENT DOCUMENTS

| 3,499,999 | 3/1970 | Sondhi ............................... 179/170.2 |
| 3,500,000 | 3/1970 | Kelly et al. ......................... 179/170.2 |
| 4,057,696 | 11/1977 | Gitlin et al. ......................... 179/170.2 |
| 4,072,830 | 2/1978 | Gitlin et al. ......................... 179/170.2 |

OTHER PUBLICATIONS

M. M. Sondhi; "An Adaptive Echo Canceller;" Bell System Technical Journal; vol. 46, No. 3; Mar. 1967; pp. 497–511.

*Primary Examiner*—Kathleen H. Claffy
*Assistant Examiner*—Randall P. Myers
*Attorney, Agent, or Firm*—Richard J. Roddy

[57] ABSTRACT

The subject echo canceller includes a controller, which uses a feedback arrangement to improve speech detector performance, for providing an improved multistate control signal responsive to which adjustment of the estimate is inhibited or not inhibited. For example, a first state of the control signal is provided when the value of a first function of the error signal exceeds the value of a second function of the error signal, the second function being an average of first function values. One first function may be the algebraic square of the error signal as normalized with respect to the energy detected in a far end signal, while the second function is the average of the normalized signal where the averaging is done over a predetermined time interval. The predetermined time intervals may be those time intervals during which near end speech is absent. Thus, if the value of the first function exceeds the value of the second function the first state control signal can be provided for inhibiting adjustment of the estimate. On the other hand, absent the exceeding, a second state control signal may be provided responsive to which the estimate may be adjusted.

7 Claims, 2 Drawing Figures

ECHO CANCELLER USING FEEDBACK TO IMPROVE SPEECH DETECTOR PERFORMANCE

BACKGROUND OF THE INVENTION

This invention relates to the mitigation of echoes in a communication circuit and, more particularly, to the cancellation of echoes in a two-way communication circuit.

Echoes commonly occur in communication systems when electrical signals on a first, incoming transmission path meet an imperfectly matched impedance at a hybrid junction and are partially reflected back to the source over a second, outgoing transmission path. Typically, signals such as speech or data signals require a nonzero travel time. As a result, the reflected signal, or echo, is heard at the far end of the second path some time after the speech signal is transmitted from the near end of the second path. As the distance between the talking and listening parties is increased, the echo takes longer to reach the talking party. As a result, the echo becomes, at least qualitatively, more annoying to the talking party. An attempt is therefore generally made to control echoes. One echo controlling arrangement includes a speech signal operated device known as an echo suppressor. Conventional echo suppressors combat echoes by interrupting signals on the second outgoing transmission path according to some decision based upon the relative levels of the incoming and outgoing signals. On the other hand, rather than interrupt the outgoing path, another echo controlling arrangement, known as an echo canceller, typically synthesizes a signal estimate of the echo signal and algebraically subtracts the estimate from the outgoing signal to obtain an error signal. Inasmuch as the echo is included in the outgoing signal, the subtraction effectively cancels the echo. For example, J. L. Kelly, Jr. and B. F. Logan in U.S. Pat. No. 3,500,000 issued Mar. 10, 1970 discloses such an echo canceller. That canceller includes an adjustable signal processor having a closed loop error control system which is self-adapting in that it automatically tracks signal variations in the outgoing path. More particularly, that echo canceller employs estimator apparatus including a transversal filter arrangement for synthesizing a linear approximation of the echo. The filter comprises a delay line having a number of taps, say an integer N taps, spaced along its length at convenient Nyquist intervals. Thereby, the echo canceller develops a number of delayed replicas of the incoming signal. The gain and polarity of each replica is independently adjusted in response to the error signal, and hence in response to the echo detected in the outgoing path. The adjusted signals are then algebraically combined to obtain the synthesized echo estimate for subtraction from the outgoing signal. Thereby, the echo is cancelled.

An improvement thereover is disclosed by M. M. Sondhi in U.S. Pat. No. 3,499,999, also issued Mar. 10, 1970. In Sondhi, an adaptive echo canceller includes a speech detector circuitwise situated to receive at a first input a signal incoming from the far end, which incoming signal is also extended to one input of a hybrid, and at a second input a near end signal outgoing to the far end, which outgoing signal is extended from an output of the hybrid. A control signal output of the speech detector is supplied to a control input of a control switching gate for closing or opening the gate. Usually, the error signal is provided to a first input of the gate for extension through the closed gate to the estimator apparatus. On the other hand, the gate is typically opened upon detection of near end speech, for example, during a situation in which both near end and far end parties are simultaneously talking. Responsive to the opened gate, the echo signal estimate is inhibited from being adjusted. To understand an advantage of the inhibiting, the outgoing signal may include not only an echo signal but also a near end speech signal. As a result, it is usual to account for the near end speech signal during the adjustment. For example, in the Sondhi canceller, on the one hand, further adjustment of the estimate is inhibited upon detection of the presence of near end speech. On the other hand, absent near end speech, the adjustment may occur. Hence, during the adjustment, the error signal is substantially the difference between the true echo signal and the estimate thereof. Thus, in accounting for the near end signal, the signal processor can be designed to adjust the estimate to converge to a zero value error signal. After the estimate is adjusted and the error signal does converge, subsequent occurences of a large error signal are typically indicative of the presence of a near end speech signal. Unfortunately, if a large error signal is taken as an indication of a near end speech signal, known echo cancellers may not converge since the estimator apparatus may inhibit further adjustment of the estimate and the error signal may remain large.

Accordingly, an object of the present invention is to provide an improved echo canceller for mitigating an echo signal in the presence of a relatively wide range of echo signals.

BRIEF DESCRIPTION OF THE DRAWINGS

My invention should become fully apparent when taken in connection with the following detailed description and the accompanying drawing in which.

SUMMARY OF THE INVENTION

This and other objects are achieved in accordance with the principles of my invention in an improved echo canceller for mitigating an echo signal in the presence of a relatively wide range of echo signals. The echo canceller includes a controller to which is fed back an error signal. The error signal obtains by way of an arrangement for combining a signal provided by an adjustable signal processor, which processor is coupled to a first transmission path, with a signal extended through a second transmission path. In accord with one aspect of my invention, the controller supplies a control signal to the signal processor for improving the responsiveness and the sensitivity of a detector supplied control signal. The controller supplied control signal is for controlling the adjustment of the processor provided signal. A first state of the controller supplied control signal is for indicating that a value of a first function of the error signal exceeds the value of a second function of the error signal, for example, the second function could be an average of the values of the first function as detected over a predetermined time interval. Responsive to detection of the first state, the signal processor inhibits adjustment of the processors provided signal. According to a second aspect of my invention, the first function is a normalized measure of the error signal. In one illustrative arrangement, the first function relates the error signal to a measure of the energy detected in the first path signal, while the second function averages the normalized measure over a predetermined time interval.

DETAILED DESCRIPTION

Figure 1:
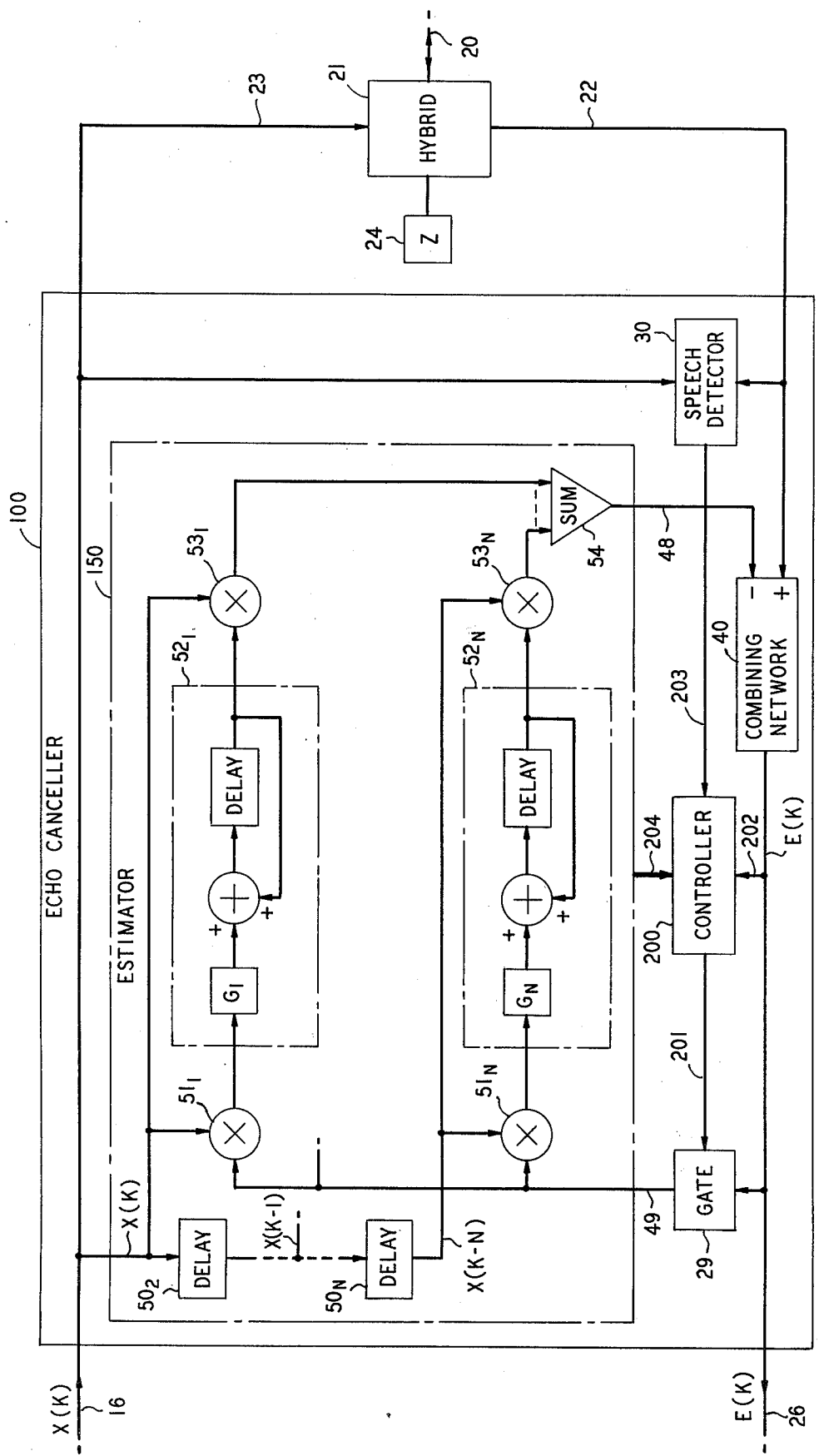
FIG. 1 illustrates an echo canceller in accord with the principles of my invention.

An illustrative embodiment of an echo canceller consistent with the principles of my invention is shown in block diagram schematic form in FIG. 1. Echo canceller 100 is broadly similar to the echo canceller disclosed in previously cited U.S. Pat. No. 3,499,999, which patent is herein incorporated by reference. However, unlike the prior art, my illustrative canceller 100 includes controller 200 for controlling the adjustment of an echo signal estimate in the presence of a relatively wide range of echo signals. Broadly, responsive to a comparison between the value of a first function of the error signal and the value of a second function of the error signal (illustrative first and second functions will shortly be described) controller 200 extends an improved control signal to control switching gate 29 for inhibiting or not inhibiting the adjustment of the echo signal estimate. Thereby, canceller 100 uses an error signal feedback arrangement to improve speech detector performance for obtaining an improved echo canceller for mitigating echo signals.

Specifically, a far end signal is usually extendable from the far end over a first transmission path, e.g., lead 16, to a first input of echo canceller 100 and therein jointly to an input of estimator apparatus 150 and a first input of speech detector 30 as well as over lead 23, perhaps through some conversion circuitry, not shown, to a first input of hybrid 21. The far end signal may, for example, be a digitally sampled speech signal, hereinafter labelled $X(K)$ where K is an integer identifying the sampling interval. The far end signal may be transmitted from a far end talking party and may be intended to be received and heard by a near end listening party. It is usually desirable for the hybrid input signal appearing on lead 23 to be extended over lead 20 to the near end listening party. However, stemming from an impedance mismatch situation, part of the input signal may be reflected back to the far end signal source as an echo. The echo is extended from an output of hybrid 21 over a second transmission path, e.g., lead 22, to a second input of echo canceller 100 and therein jointly to a second input of speech detector 30 and a first input of combining network 40. A second input of network 40 is a signal estimate of the echo. The estimate is extended to network 40 over lead 48 from an output of estimator 150. As shown in the prior art, an adjustable signal processor such as estimator 150 may be implemented using well known techniques for combining transversal filter, delay and multiplier apparatus to provide the estimate of the echo at its output. Combining network 40 is usually a simple difference network for providing an output signal corresponding to the algebraic difference between its first and second input signals. That difference signal is error signal $E(K)$ and is extended from the output of combining network 40, as in the prior art, over lead 26 to the far end as well as jointly to a first input of control switching gate 29 and, unlike the prior art, over lead 202 to a first input of controller 200. The control signal output of controller 200 is provided over lead 201 to a control input of gate 29 for controlling the opening or closing of the gate, and hence for inhibiting or not inhibiting, respectively, estimator 150 in the adjustment of the estimate. As in the prior art, responsive to an open gate, the adjustment is inhibited. Specifically, error signal $E(K)$ on lead 26 is removed from lead 49 as an input to estimator 150 and is replaced with a zero value signal for inhibiting adjustment of the echo signal estimate on lead 48. On the other hand, responsive to a closed gate, error signal $E(K)$ on lead 26 is extended through gate 29 onto lead 49 as an input to estimator 150 responsive to which the echo signal estimate may be adjusted.

More particularly, whereas, in the prior art, the control signal provided to the control input of control switching gate 29 is typically extended directly from an output of a speech detector such as detector 30, in accord with the principles of my invention, controller 200 is circuitwise situated between the output of speech detector 30 and the control input of gate 29 for providing an improved control signal, which is responsive to error signal $E(K)$ on lead 202, to far end signal $X(K)$ and its delayed replica on cable 204, and to a status signal on lead 203 for indicating the detection of the presence or absence of near end speech signals.

Figure 2:
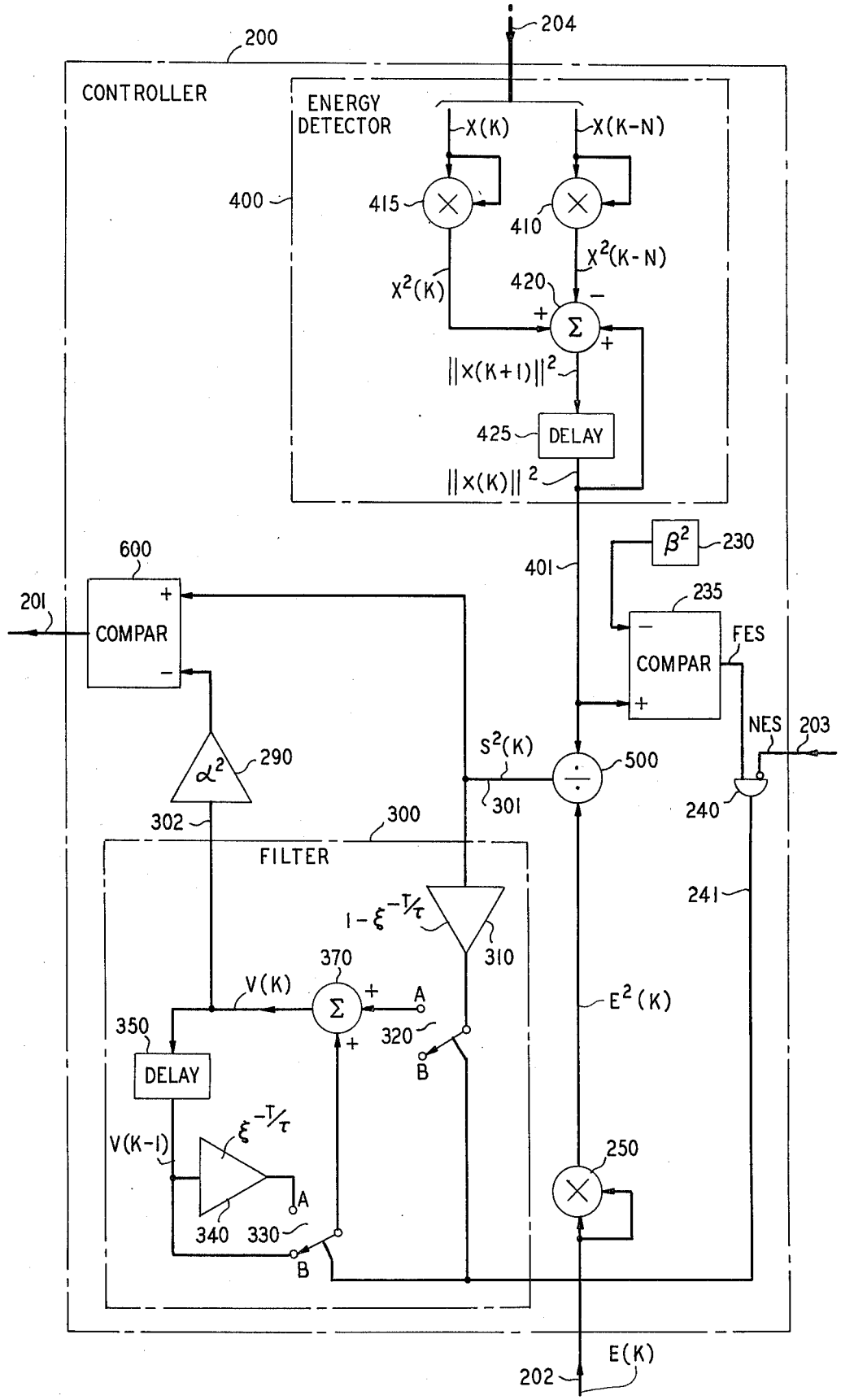
FIG. 2 illustrates a controller for use in the echo canceller of FIG. 1.

An illustrative embodiment of controller 200 is schematically shown in FIG. 2. Broadly, controller 200 includes energy detector 400 for detecting the energy in the far end signal; divider 500 for providing to lead 301 a normalized measure $S^2(K)$ of error signal $E(K)$ on lead 202; filter 300 for averaging the normalized measure over a predetermined time interval and for extending the average over lead 302; and comparator 600 for extending the improved control signal over lead 201 responsive to a comparison between the measure and the average of the measure. More particularly, illustrative controller 200 includes apparatus for extending a logic one output control signal to the control input of control switching gate 29 upon detection of the value of a first function of the error signal exceeding the value of a second function; otherwise, a logic zero is so extended. Responsive to the logic one, gate 29 may be opened for inhibiting adjustment of the estimate provided by estimator 150. Otherwise, gate 29 is closed and estimator 150 is not inhibited but rather adaptively adjusts the estimate responsive to error signal $E(K)$.

In one illustrative embodiment, which is not shown in FIG. 2, the first function could be the algebraic square of the magnitude of the error signal detected on lead 202; while the second function could be related to the average energy detected in the error signal, the averaging occurring over a predetermined time interval. Hence, the output signal of controller 200 could be a logic one responsive to the value of the square of the magnitude of the error signal exceeding the value of the average energy detected in the error signal over the time interval. Such exceeding would typically be satisfied if, for example, the particular error signal happened to be large. On the other hand, the exceeding may be satisfied if the near end party begins talking and the near end speech signal is added to the error signal. As to the averaging time interval, same may be representative of the recent past. Too, the time interval over which the average energy is detected need not be a continuous real time interval. Rather, the predetermined time interval could be a time interval during which near end speech is absent. Thereby, one of the aforementioned exceeding stimuli, i.e., that stemming from having a near end speech signal added to the error signal, can be mitigated. As a result, the echo canceller can be more responsive and more sensitive to changes in the echo signal. Thus, an improved echo canceller for mitigating an echo signal in the presence of a relatively wide range of echo signals is obtained.

In a second illustrative embodiment, which is shown in FIG. 2, the first function is that of a normalized measure of the error signal while the second function is that of an average of the normalized measure. Although the error signal could be normalized as to other measures, in my illustrative embodiment, error signal E(K), or more properly the algebraic square thereof $E^2(K)$, is normalized as to a measure of the far end signal energy. The resultant normalized measure is herein symbolized as $S^2(K)$. Specifically, error signal E(K) on lead 202 is fed back and algebraically squared by multiplier 250, an output $E^2(K)$ of which is extended to a dividend input of divider 500. The far end signal energy for normalizing the error signal is detected by energy detector 400, an energy signal output $||X(K)||^2$ of which is extended jointly over lead 401 to a first input of comparator 235 and to a divisor input of divider 500. The normalized measure $S^2(K)$ ($= E^2(K)/||X(K)||^2$) is extended from an output of divider 500 over lead 301 jointly to a first input of filter 300 and to a first input of comparator 600. Within filter 300, the normalized measure $S^2(K)$ is averaged over a time interval which is determined in response to a status signal supplied over lead 203 from speech detector 30. Here the averaging time interval is determined responsive to a logic zero status signal indicating the absence of near end speech. The averaged measure output of filter 300 is extended over lead 302 through amplifier 290 where its gain is adjusted by a factor $\alpha^2$ to a second input of comparator 600. Upon detection of the normalized measure $S^2(K)$ at the first input exceeding the averaged measure (adjusted by the factor $\alpha^2$) at the second input, a logic one control signal is extended from the control signal output of comparator 600 over lead 201 to control switching gate 29; else a logic zero control signal is so extended.

Still more particularly, as to filter 300, in a digital system, signals are typically sampled at discrete time intervals. Commonly, signals are sampled at an 8,000 Hertz sampling rate, which equates to an intersample time interval, T, of 125 microseconds. When the sampled signals are supplied as an input U(K) to a linear filter having a transfer function F(K), the filter output V(K) is mathematically given as:

$$V(K) = F(K) * U(K) \qquad (1)$$

where the asterisk (*) denotes convolution and K is an integer identifying the sampling interval. The transfer function F(K) of a discrete, unity gain, low pass filter with a single pole at $1/\tau$ radians per second is stateable in well known fashion as:

$$F(K) = (1-\epsilon^{-T/\tau})\epsilon^{-KT/\tau}, K \geq 0 \qquad (2)$$

where typically $\tau$ is much larger than T, e.g., $\tau = 10$ T, and where $\epsilon$ is the natural logarithmic base. In well known fashion equation (1) can be solved recursively using equation (2) whereby $$V(K) = \epsilon^{-T/\tau}V(K-1) + (1-\epsilon^{-T/\tau})U(K) \qquad (3)$$

and wherein V(0) may equal zero. Recursive solution equation (3) is here embodied in filter 300 of FIG. 2, the input U(K) being equal to the normalized measures $S^2(K)$ as supplied to the filter input over lead 301, i.e., $U(K) = S^2(K)$. As aforementioned, the predetermined time interval during which the normalized measure is averaged is here a time interval during which near end speech is absent. In the straightforward fashion, the status signal indicating the absence of near end speech is extended over lead 203 from an output of speech detector 30 as a logic zero; while a signal indicating the presence of near end speech is so extended as a logic one. The near end speech (NES) status signal is supplied to a first inverting input of AND gate 240.

If the averaging were to occur only in the absence of near end speech, another problem may arise. For example, in the absence of a far end speech signal, the far end signal energy detected on lead 16 may be small. But, rather than being the energy from a far end talking party, the energy may in reality be quantization noise, channel noise, etc. To mitigate this problem, my illustrative embodiment advantageously includes apparatus including comparator 235 for supplying a threshold signal indicating that the far end signal energy exceeds (logic one) or does not exceed (logic zero) a prefixed threshold $\beta^2$. Thus, a signal representing the far end signal energy is extended from output of energy detector 400 over lead 401 to a first input of comparator 235. A second input to comparator input 235 is the prefixed threshold $\beta^2$ extended thereto from apparatus 230. The threshold signal output of comparator 235 is supplied to a second input of AND gate 240. Accordingly, an output of AND gate 240, called hereinafter a wiper control signal, is a logic one upon detection of the coincidence of the absence of near end speech and the presence of a far end signal having energy exceeding the threshold $\beta^2$; otherwise the output of AND gate 240 is a logic zero. The output of gate 240 is extended over lead 241 to a second input of filter 300, and therein to straightforward apparatus for controlling a wiper on each of switches 320 and 330. Specifically, the wipers are moved to a position A in response to a logic one wiper control signal and to a position B in response to a logic zero wiper control signal. Responsive to the wiper position, normalized measure $S^2(K)$ may be averaged in the absence of near end speech and not averaged in the presence of near end speech.

Operationally, responsive to logic one wiper control signal on lead 241, the wipers of switches 320 and 330 are moved to position A. As a result, normalized measure $S^2(K)$, as supplied over lead 301, is extended through amplifier 310 for adjusting the gain of the measure by a factor $1-\epsilon^{T/\tau}$. Concurrently, the prior filter output V(K-1) i.e., the filter output after being delayed one intersampling time T by delay network 350, is extended through amplifier 340 to have its gain adjusted by a factor $\epsilon^{-T/\tau}$. Consistent with Equation (3), the outputs of amplifiers 310 and 340 are extended to first and second inputs, respectively, and are arithmetically added by summer network 370 to obtain the averaged normalized measure V(K) for extension, as aforementioned, over lead 302 through amplifier 290 onto the second input of comparator 600.

On detection of the presence of near end speech i.e., in response to a logic zero wiper control signal on lead 341, the wipers of switches 320 and 330 are moved to position B. Thereby, the output of amplifier 310 is isolated from the first input of summer network 370 and a zero value signal is substituted therefor. Also, the delayed filter output V(K-1) is extended from an output of delay network 350 through switch 330 to the second input of summer 370. Hence, in the presence of near end speech, no adjustment to the average is undertaken from sample period to sample period.

Finally, energy detector 400 is for detecting the energy in the far end signal. In particular, a far end signal X(K) as detected on lead 16 and the N-th delayed replica thereof, i.e., X(K−N), are extended in a straightforward manner from estimator 150 over cable 204 to energy detector 400. Therein, X(K) and X(K−N) are algebraically squared respectively by multipliers 415 and 410 and, by way of summer network 420, to the algebraic difference of the squares is added the far end energy as detected during the immediately prior sample interval, the latter as supplied from an output of sample delay network 425. An output of network 420 is a representation of the energy detected in the far end signal. The energy representation is then delayed for one sample period by delay network 425 and is extended, as aformentioned, jointly to an input of summer 420, to the divisor input of divider 500 and to the first input of comparator 235.

In light of the above description, the manner in which the principles of my invention use a feedback arrangement to improve speech detector performance in an echo canceller should be clear. Summarily, however, responsive to the normalized measure output of divider 500, $S^2(K)$, exceeding the average of the normalized measure as adjusted by a prefixed factor, $\alpha^2$, and as averaged over a predetermined time interval, the aforementioned improved control signal is provided over lead 201 for controlling the inhibiting and not inhibiting of the echo signal estimate. Thereby, in accord with the aforedescribed principles of my invention, an improved echo canceller for mitigating an echo signal in the presence of a relatively wide range of echo signals is obtained.

I claim:

1. An echo canceller including an adjustable signal processor coupled to a first transmission path;
    means coupled to a second transmission path for combining a signal in said second path with a signal extended from said processor;
    said combining means for providing an error signal;
    means for extending said error signal to said processor;
    said processor including
    means responsive to said error signal for adjusting said processor extended signal, said processor extended signal being an estimate of said second path signal; and
    detector means responsive to signals in said first and said second paths for providing a detection status signal and CHARACTERIZED IN THAT said echo canceller further comprises:
    controller means responsive to said detection status signal, a first path signal, and said error signal for extending a control signal to said error signal extending means for controlling the adjusting of said signal processor;
    said control signal including a first state responsive to which said processor inhibits adjusting said estimate;
    said first inhibiting state being extendable upon detection of the value of a first function of said error signal exceeding the value of a second function of said error signal.

2. The apparatus defined in claim 1 wherein said first function relates a normalized measure of said error signal and said second function relates a measure of the average of said first function measure, said average being over a predetermined time interval.

3. The apparatus defined in claim 2 wherein said normalization is with respect to the signal energy detected in said first transmission path.

4. The apparatus defined in claim 1 wherein said control signal includes a second state responsive to which said signal processor does not inhibit adjusting said processor extended signal estimate.

5. The apparatus defined in claim 4 wherein said first, inhibiting state of said control signal is provided responsive to a first state of said detection status signal and said second, not inhibiting state of said control signal is provided responsive to a second state of said detection status signal.

6. An echo canceller including estimator apparatus coupled to a first transmission path;
    means coupled to a second transmission path for combining a signal in said second path with a signal estimate;
    said signal estimate being extended from an output of said estimator apparatus;
    said combining means for providing an error signal;
    means for extending said error signal to said estimator apparatus for adjusting said signal estimate; and
    detector means responsive to signals in said first and said second paths for providing a detection status signal and CHARACTERIZED IN THAT said echo canceller further comprises:
    a controller including an energy detector for detecting the signal energy in said first transmission path;
    means for extending said error signal and for extending a measure of said signal energy to normalization apparatus, said normalization apparatus for normalizing said error signal with respect to said detected energy and for providing a normalized signal;
    means for extending said normalized signal to averaging apparatus said averaging apparatus for averaging said normalized signal over a predetermined time interval;
    means for extending a first state of a control signal to said error signal extending means for controlling the adjusting of said estimate upon detection of a value of said normalized signal exceeding a value related to said average.

7. The apparatus defined in claim 6 wherein said averaging apparatus includes means for averaging said normalized signal upon detection of the coincidence of a first state of said detection status signal for indicating the presence of a predetermined second path signal and said first transmission path signal energy exceeding a prefixed threshold.

* * * * *